C. A. JUENGST.
BOOK OR PAMPHLET COVERING MACHINE.
APPLICATION FILED APR. 18, 1916.
1,193,395.
Patented Aug. 1, 1916.
10 SHEETS—SHEET 1.
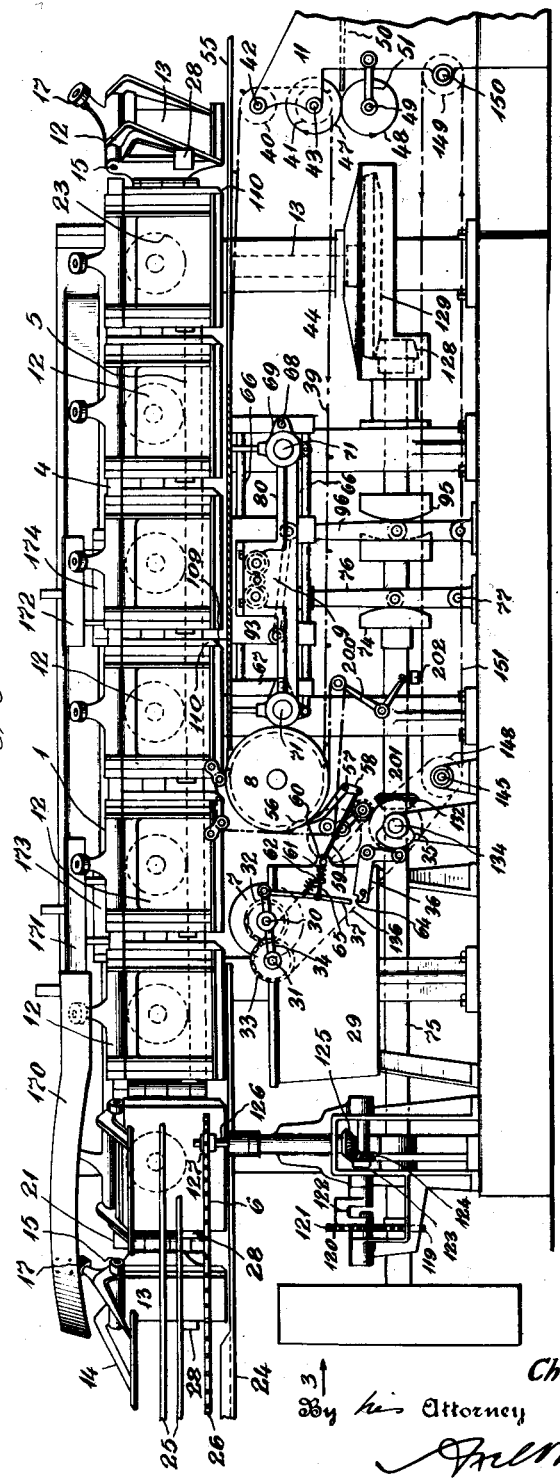
Inventor
Charles A. Juengst
By his Attorney

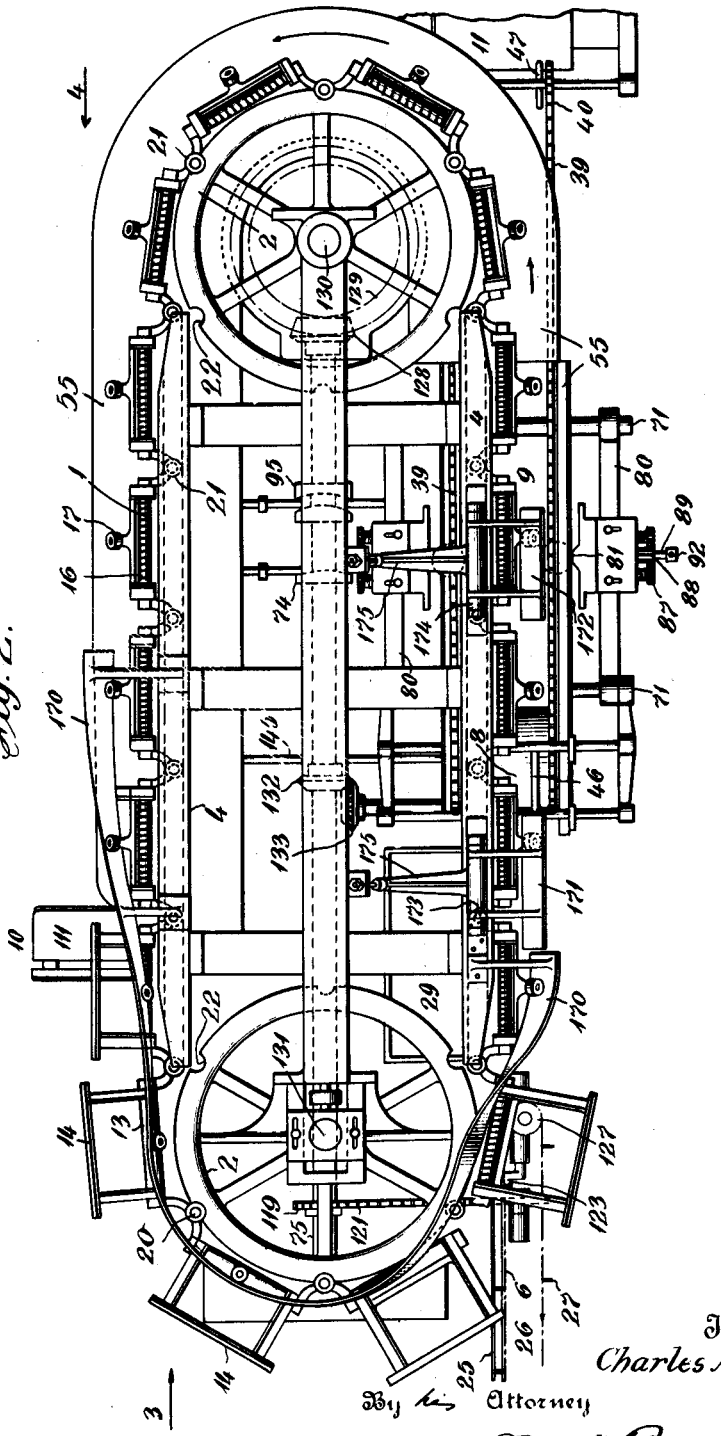

C. A. JUENGST.
BOOK OR PAMPHLET COVERING MACHINE.
APPLICATION FILED APR. 18, 1916.
1,193,395.
Patented Aug. 1, 1916.
10 SHEETS—SHEET 3.
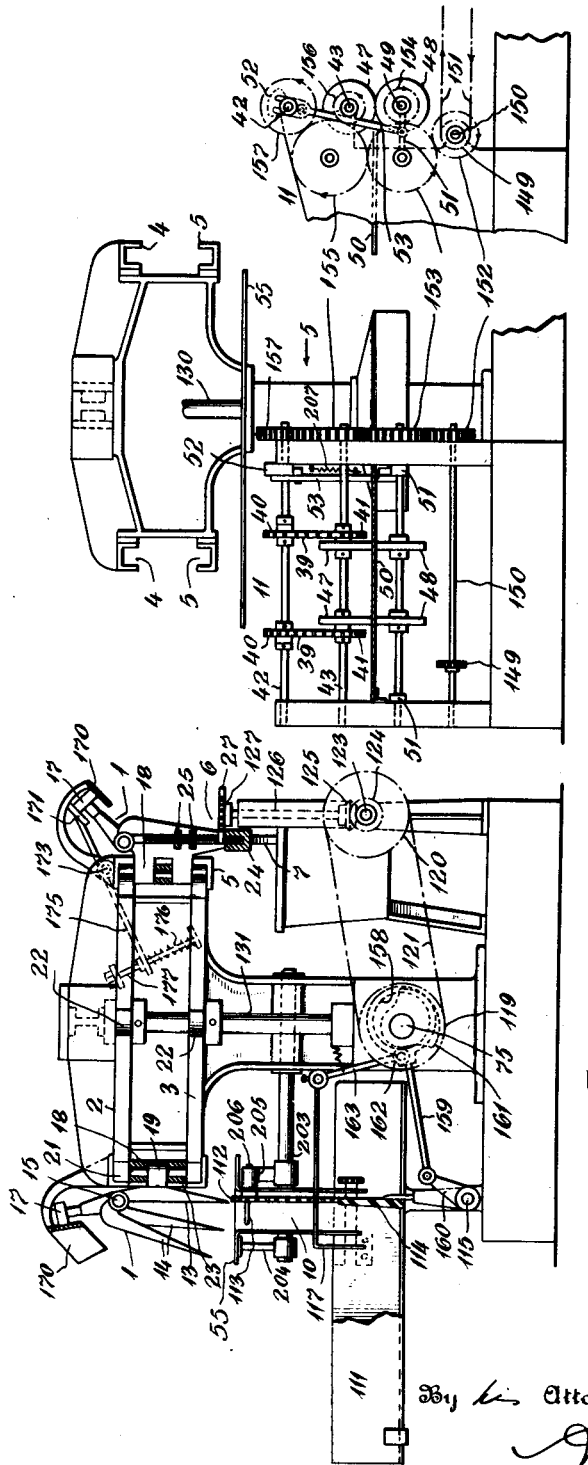
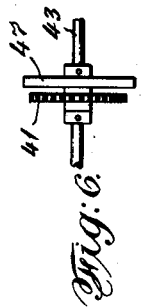
Inventor
Charles A. Juengst

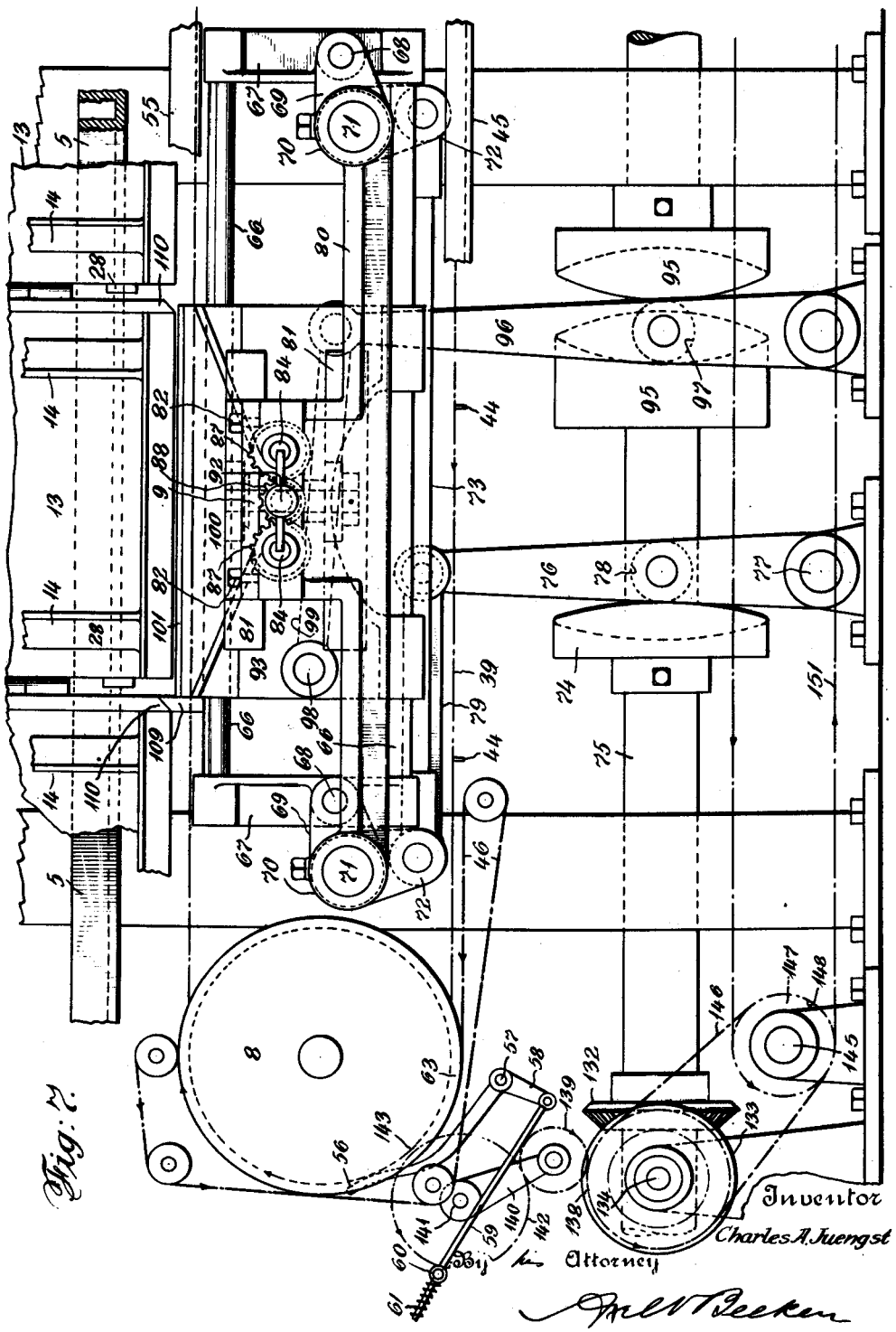

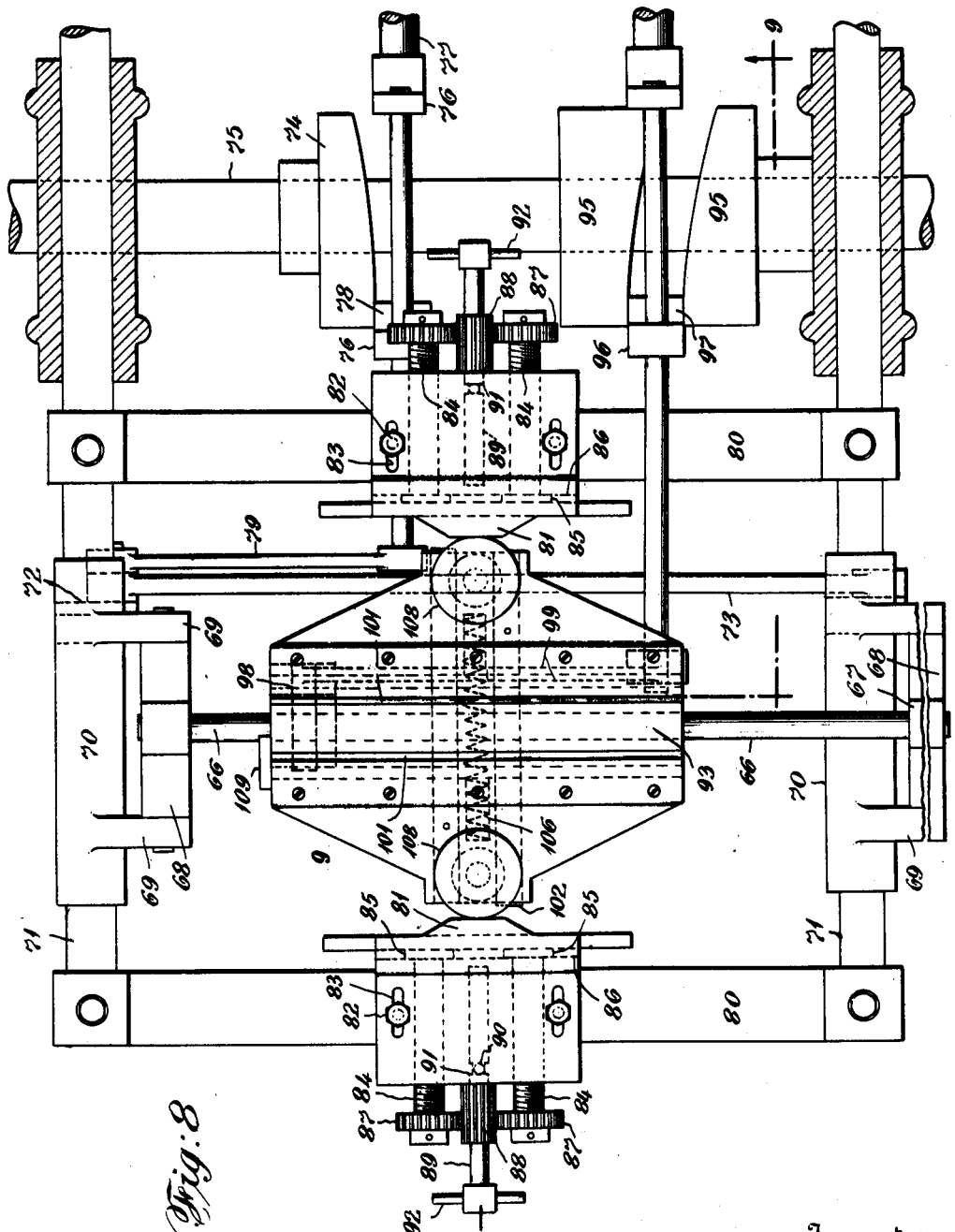

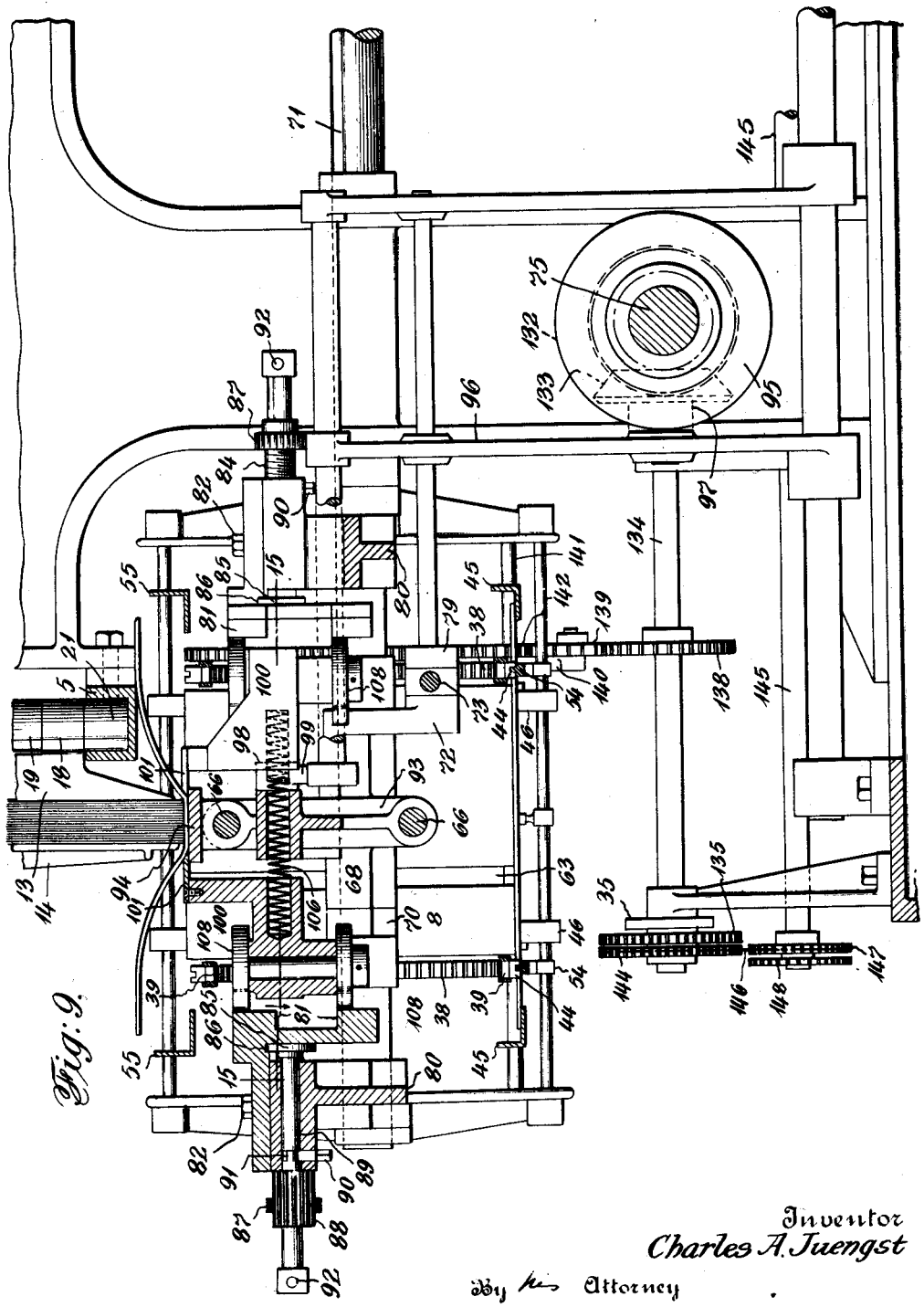

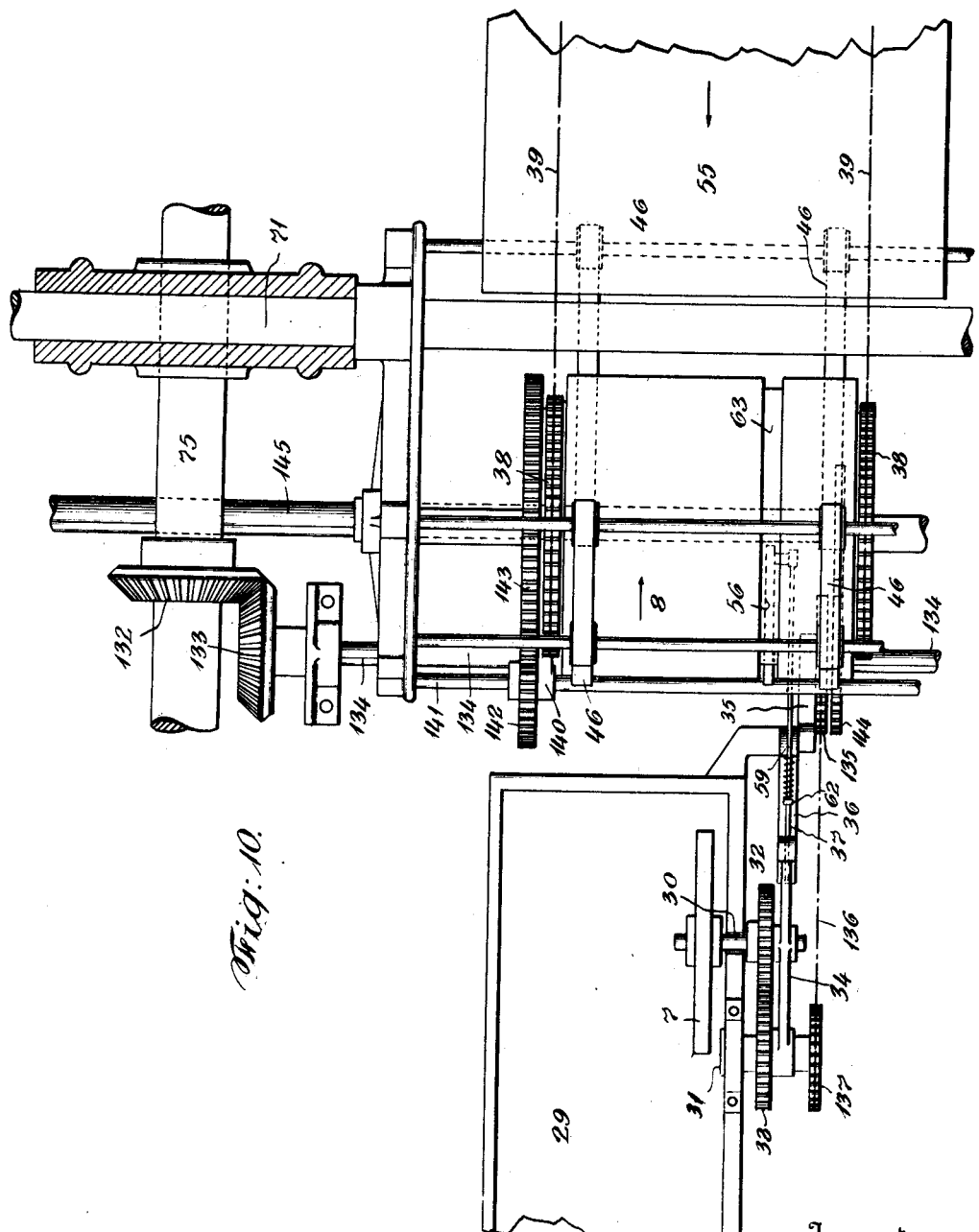

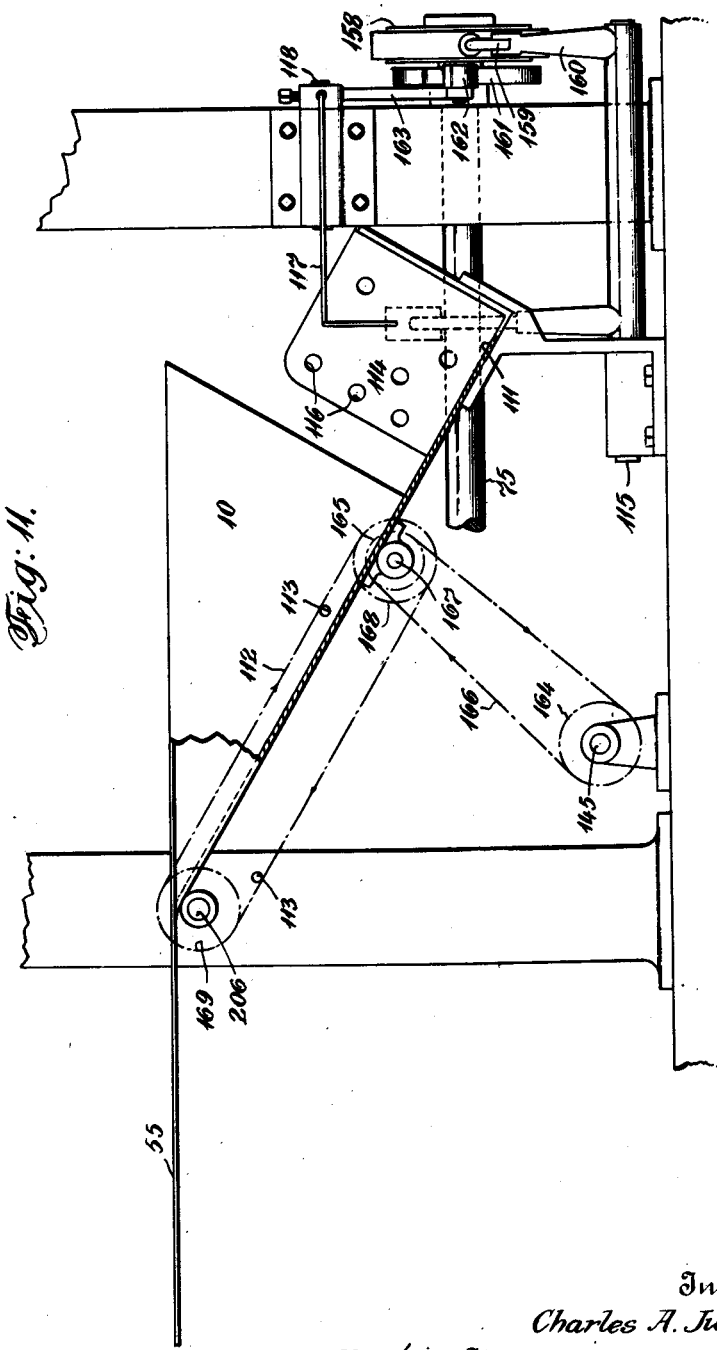

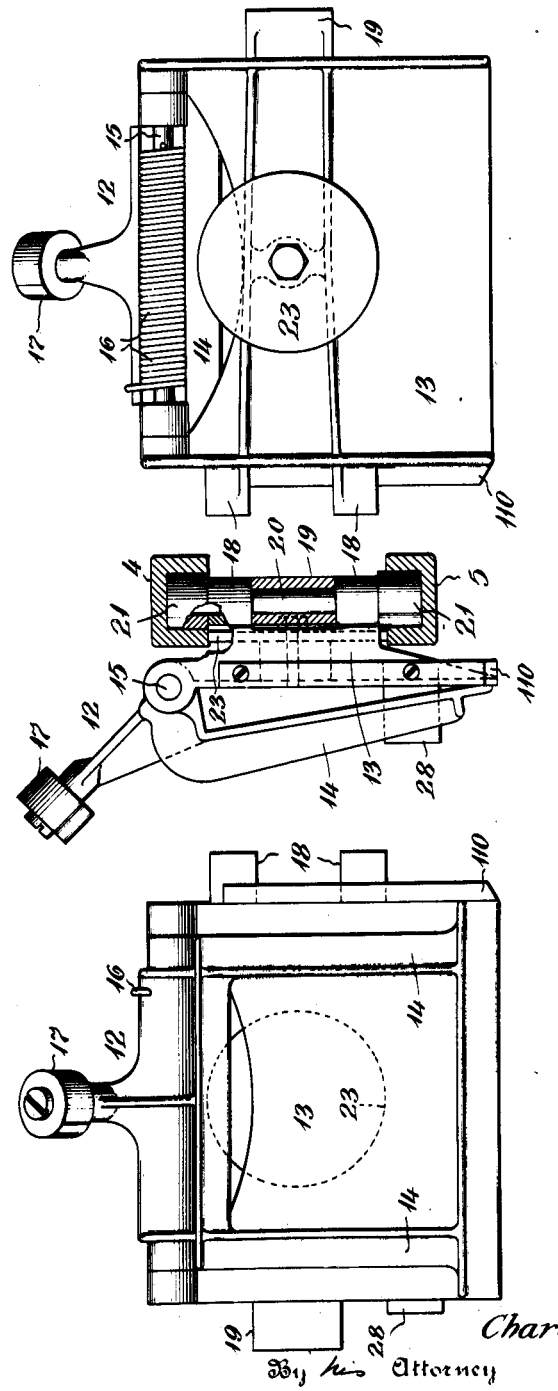

C. A. JUENGST.
BOOK OR PAMPHLET COVERING MACHINE.
APPLICATION FILED APR. 18, 1916.
1,193,395.
Patented Aug. 1, 1916.
10 SHEETS—SHEET 10.
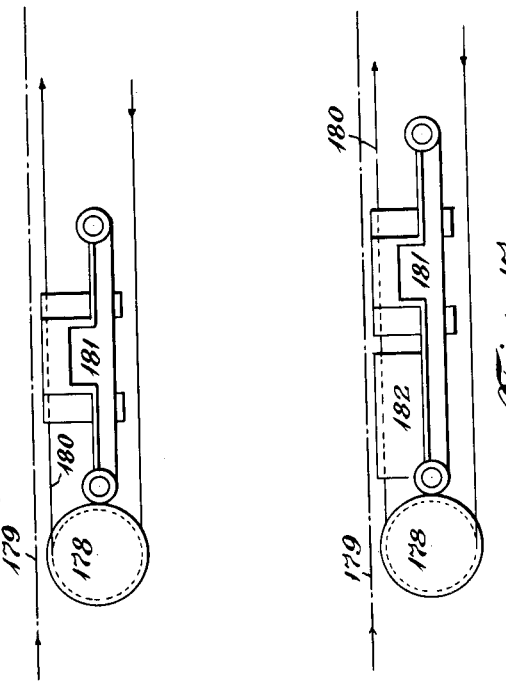
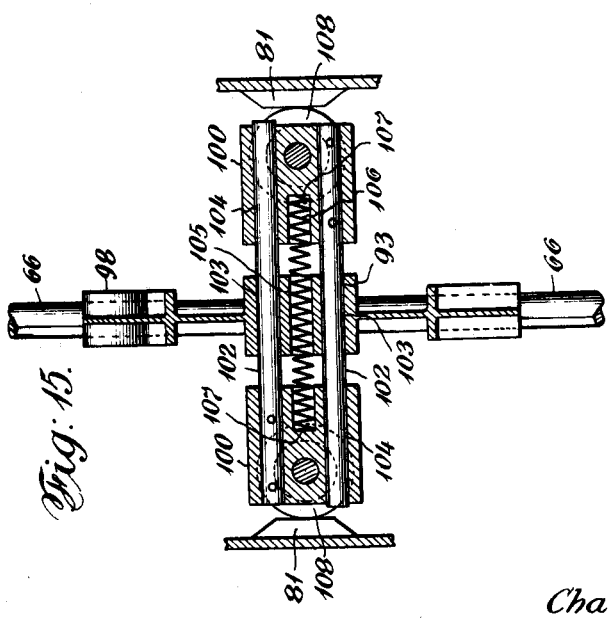
Inventor
Charles A Juengst
By his Attorney

UNITED STATES PATENT OFFICE.

CHARLES A. JUENGST, OF CROTON FALLS, NEW YORK.

BOOK OR PAMPHLET COVERING MACHINE.

1,193,395.  Specification of Letters Patent.  Patented Aug. 1, 1916.

Original application filed March 19, 1910, Serial No. 550,305. Divided and this application filed April 18, 1916. Serial No. 91,863.

*To all whom it may concern:*

Be it known that I, CHARLES A. JUENGST, a citizen of the United States, and a resident of Croton Falls, in the county of Westchester and State of New York, have invented certain new and useful Improvements in Book or Pamphlet Covering Machines, of which the following is a specification.

The present invention relates to book or pamphlet covering machines, and has for its main object a general reorganization of prior structures whereby books may be more expeditiously handled.

This application is a division of application Serial No. 550,305, filed March 19, 1910.

In the prior art it has been customary to employ a book conveyer having an intermittent motion, and to apply the cover while the book is standing still.

One of the features of the present invention is to provide means for applying the cover while the book is traveling, to the end that a continuously advancing book conveyer may be employed. In this manner the book is handled quicker, and I am enabled to more readily connect the book covering machine up with a continuous running signature gathering or other machine, such as a stitcher.

In carrying out this invention there is employed a cover breaker which travels longitudinally in unison with the book conveyer or the jaws and book support of which have a movement substantially in synchronism with the advance of the conveyer while breaking the cover or acting on the book.

The cover may be fed to the books in any suitable manner, but, in the present form, an endless conveyer having pusher fingers is utilized. Preferably the books to be covered are fed automatically to the book conveyer. In this manner, the operation of making the books can be made automatic and continuous throughout without any intervention on the part of the operator. In the form of the invention disclosed, the books may be brought automatically from a signature gathering or other machine, such as a stitcher or sewing machine. In order to carry out this object of the invention, means are provided for feeding the books to the book conveyer in a horizontal direction and upright position. These feeding means feed the books in the same direction as the advancing movement of the book conveyer, and at an angle to the opening and closing movement of the book clamps carried by the conveyer.

A further object of the invention is to prevent the application of glue to the book in case no cover is fed into the machine at the appropriate time to meet a certain book. This feature of the invention consists in means controlled by the cover feeding mechanism for preventing the application of glue to the book. These means may take many forms, but in the present instance the book or the glue roller is given a movement one or both with relation to the other. As here shown, the glue roller has a movement toward and away from the path of the book, which movement is interrupted by the absence of a blank or cover in the cover feeding means. In the specific form here shown, the cover drum or cylinder is conveniently utilized to effect this interruption by arranging a feeler over a groove in the cylinder. This feeler controls the connection between the glue roller and the actuating means for raising and lowering the same.

The book clamps have an opening and closing movement at an angle to the advancing movement of the conveyer. This movement may be either rectilinear or, as shown in the present instance, curvilinear. Means are provided for opening and closing these clamps to receive and discharge books during the travel of the conveyer. Preferably, as shown, the clamps are normally held closed, as by means of springs, and are opened to discharge and receive the books by suitable means, as cams. The books may be discharged in any suitable manner. Preferably an inclined chute is employed which closes the cover on the book. This chute will preferably lead to a stacker, which stacks the books.

Other features of construction, combination of parts and arrangement of elements will appear as the specification proceeds.

In the accompanying drawings the invention is embodied in a concrete and several preferred forms, but changes of construction may of course be made without departing from the legitimate and intended scope of the invention.

In the said drawings: Figure 1 is a side elevation of a machine, embodying the invention, with some of the parts removed. Fig. 2 is a general top plan view of Fig. 1. Fig. 3 is an end view looking in the direction of the arrow 3 (Fig. 2) with the book conveyer and operating cam for the book clamps in section. Fig. 4 is an end view of the framework of the machine looking in the direction of the arrow 4 (Fig. 2), showing also the cover feeding mechanism. Fig. 5 is a side elevation of the gearing of the cover feeding mechanism looking in the direction of the arrow 5 (Fig. 4). Fig. 6 is a detail view of one of the drop rollers showing how it is mounted. Fig. 7 is a side elevation of the cover breaker and adjacent parts. Fig. 8 is a plan view partly in section of the cover breaker shown in Fig. 7. Fig. 9 is a vertical transverse sectional view on the irregular line 9—9 (Fig. 8). Fig. 10 is a top plan view of the cover feed drum, glue pot and roller, detector device and adjacent elements. Fig. 11 is a side elevation of the delivery chute and stacker. Fig. 12 is a front view of one of the book clamps. Fig. 13 is a side view of the clamp shown in position on the guides of the framework, said guides being in section. Fig. 14 is a rear view of the clamp. Fig. 15 is a transverse horizontal sectional view on the line 15—15 (Fig. 9). Figs. 16 and 17 are diagrammatic side elevations showing modifications of the cover presser and breaker.

Similar characters of reference indicate corresponding parts in the several views.

In the drawings 1 indicates the book conveyer which passes around the upper and lower sprocket wheels 2 and 3 at each end and which slides in the guides 4 and 5. The means for feeding books to the conveyer are indicated by 6, while 7 denotes the glue roller, 8 a drum forming the cover presser, 9 the cover breaker, 10 is the delivery chute, and 11 is the cover feed mechanism. (See Figs. 1 and 2).

Each book clamp 12 consists of a relatively stationary member 13 to which is pivoted the movable member 14 by means of the horizontal pivot 15. Normally the movable member 14 is held closed by means of the spring 16 which is attached at one end to the pivot 15 and at its other end to the movable member 14. 17 is a cam roller carried by the movable member 14 and which by engaging with a suitable cam opens the book clamp.

The book clamps are hinged together to form a conveyer, the member 13 being to that end provided with hinge members 18 and 19 connected together by means of the pins 20. These pins 20 carry horizontally disposed rollers 21 at their upper and lower ends which, it will be seen rotate on a substantially vertical axis and travel between the flanges respectively of the upper and lower horizontally disposed guides 4 and 5 of the framework. These guides 4 and 5 terminate at the point where the sprocket wheels 2 and 3 are located and are arranged in the same horizontal plane as the latter so that these sprocket wheels virtually form continuations of the guides 4 and 5. The sprocket wheels 2 and 3 are provided with slots 22 into which the horizontal guide rolls 21 fit, and by these means the book conveyer is driven. The clamps further carry vertically disposed bearers or rolls 23 which rotate on a substantially horizontal axis and travel between the upper and lower guides 4 and 5 and between the upper and lower sprockets 2 and 3.

Adjacent to one end of the machine there is located suitable book feeding means consisting in the present instance of a lower guide 24, vertically superposed and longitudinally extending side guides 25 and a conveyer chain 26 having fingers 27. The books are here supposed to come from a signature gatherer and stitcher and slide along on the guide 24 between the guides 25, motion being imparted to the books by means of the fingers 27.

The books are fed to the book covering machine in a horizontal direction, while standing in an upright position with their backs lowermost. As the books travel in the same general direction as the advancing movement of the book conveyer they will be brought into the open book clamp and when the fingers 27 have ceased to act on the books, the gage 28, carried by each clamp, will take hold of the book and properly register it with reference to the cover subsequently to be applied. The clamp then closes on the book, and the latter is then carried forward with the advancing movement of the book conveyer.

Located underneath the book conveyer is a glue pot 29 which feeds the glue roller 7. The latter is rotatably mounted on the stud 30 and receives its motion from the shaft 31 by means of the gears 32 and 33. The stud 30 is carried by the arm 34 secured to the shaft 31, and has imparted to it an up and down motion by means of the cam 35 which actuates the bell crank 36 controlling the connection 37 between the said bell crank 36 and arm 34. As the book passes over the glue roller, the latter is raised into contact with the back of the book and an adhesive is applied to the back of the said book.

The cover presser which is here shown as the cylinder or cover drum 8 is located in the rear of the adhesive applying means. As the book passes over the cover presser, the cover meets the book and is pressed firmly into contact with the back of the book, to which glue has already been applied. The drum thus forms a cover presser which by reason of its rounded contact surface applies the cover gradually and presses it in place progressively the full length of the book.

The cover conveyer is here constructed as follows: Carried on the same shaft as the cover drum 8 are two sprockets 38 of less pitch diameter than the pitch diameter of the cylinder 8. Passing over these sprockets are two endless chains 39. These chains are supported at their other end each by two sets of sprockets 40 and 41. The sprockets 40 and 41 are loosely mounted on the shafts 42 and 43, so that the chains 39 are driven from the shaft of the cylinder 8 and not from the shafts 42 and 43. The chains 39 are provided with pusher fingers 44 which serve to move the sheet or cover along the guides or sheet support 45, extending from the rollers 47 and 48 to the cylinder 8, until it reaches the cylinder 8. When the sheet reaches this cylinder the fingers 44 run down below the pitch circumference of the cylinder 8 and the tapes 46 serve to convey the cover around the cylinder to the top thereof. As the surface speed of the cylinder 8 is greater than the speed of the chains 39, the speed of the cover will be accelerated and it will leave the pusher fingers 44.

200 indicates a belt tightener consisting of a plurality of bell cranks mounted on the pivot 201 and provided with the weights 202. By this means the tension of the tapes 46 is regulated.

The cover may be fed to the chains 39 in any suitable manner. For instance an automatic sheet feeding device of any type may be employed. In the present instance there are utilized two pairs of drop rollers 47 and 48 which are mounted fast on the shafts 43 and 49. These drop rollers rotate at a higher speed than the chains 39 so that when a sheet or cover from the feed board 50 is placed in the bite of these drop rollers, it is fed to the chains 39 with a quick motion. The shaft 49 is hung on two arms 51 which are moved up and down, to nip the sheet, by means of the cam 52, spring 207 and connecting rod 53. The pusher fingers 44 in addition to moving the sheet also serve as gages to register the sheet or cover to coincide with the books carried by the clamps, and which books are registered by means of the gages 28. Preferably the number of book clamps and the number of divisions or pusher fingers on the chains 39 is equal. In the present instance there are eighteen book clamps and a similar number of pusher fingers 44. In order to prevent sagging of the chains 39, the pusher fingers 44 may travel on longitudinal guides 54 supported on the frame. The chains 39 encircle the cover breaker 9, and run at the top below the upper sheet support 55 which latter has a slot in it co-extensive with the cover breaker. Otherwise this upper sheet support is unbroken and extends as a shelf around the machine below the book conveyer, from the point where the cover breaker is located to the point where the delivery chute 10 is located. In order to prevent the glue roller 7 from applying paste to the book when there is no cover to meet a certain book, means are provided for tripping the glue roller.

56 indicates a spring feeler pivoted at 57. This feeler is connected by means of the link 58 to the rod 59 which passes through the stud 60 and is attached to the connection 37. A spring 61 is located between the stud 60 and the collar 62, and normally tends to push the spring feeler 56 into the groove 63 of the cover drum 8, and the connection 37 off the heel 64 of the bell crank 36. The spring 65 (see Fig. 1) tends to counteract the spring 61 and assists in restoring the connection 37 to its seat on the heel 64. When no cover is on the drum 8, the feeler 56 is forced into the groove 63 and the connection 37 is forced off the heel 64. The connection between the arm 34 and the actuating cam 35 is therefore broken and the glue roller is not raised. When, however, the cover comes along on the drum 8, the feeler 56 is forced outward thereby restoring the connection 37 to its seat on the heel 64, so that as the cam 35 rotates, the glue roller 7 will be raised. The spring 65 being opposed to the spring 61 assists the cover in displacing the feeler finger out of the groove in the cylinder and being attached directly to the connection 37, assists in replacing said connection in engagement with the heel 64.

The cover breaker is movable horizontally on a vertically adjustable guide which guide comprises two horizontal shafts 66 connected together by means of the vertical bars 67. This guide is mounted on the transverse studs 68 swung on the arms 69 of the bushing 70 on the transverse fixed supporting shafts 71. 72 indicate depending arms from the bushing 70 connected together by means of the rod 73.

74 is a cam mounted on the main shaft 75. The motion of this cam is transmitted by means of a lever 76 pivoted at 77 and having a cam roll 78. This lever 76 is connected to one of the depending arms 72 by means of the connection 79. Under the influence of the cam 74, the guide is raised and lowered by turning the bushings 70 around the two supporting shafts 71.

Extending between the supporting shafts 71 are the brace rods 80 which carry the breaker cams 81 on opposite sides of the guides. These breaker cams are mounted, and adjustable in a transverse direction, on the brace rods 80 and are held in position by means of the set screws 82 passing through the slots 83. Two adjusting screws 84 extend through the brace rods and are provided at their inner ends with a head 85 fitting in a recess 86 of the breaker cams. The screws 84 have pinions 87 on their outer ends which mesh with a central and long gear 88 mounted on a pintle 89 which turns idly in the brace rods 80 and is held in position by a set screw 90 extending into the circumferential slot 91. When the set screws 82 are loosened, the breaker cams can be adjusted by turning the handle 92 on the gear 88.

Mounted on the shafts 66 of the guide is a slide 93 provided with a central book support 94. This slide is caused to reciprocate by the cam 95, acting through the lever 96, having the cam roll 97, and connected to the pivot 98 of the slide by means of the rod 99. Mounted longitudinally on the brackets 100 opposite to each other are the cover breaker jaws 101. Secured to each bracket 100 is a guide rod 102 which slides through holes 103 in the slide 93 and in a corresponding hole 104 in the opposite bracket 100. Passing through a hole 105 in the slide 93 is a spring 106 which engages in the sockets 107 of the cover breaker jaws 101 and normally presses them apart. Carried by the brackets 100 are rollers 108 which engage with the cams 81 as the slide 93 reciprocates and counteract the effect of the spring 106 thereby moving the cover breaker jaws 101 inwardly to break the cover. As the book comes opposite the cover breaker, the guide comprising the two shafts 66 and the elements carried thereby rises by reason of the bushings 70 being turned around the supporting shafts 71 under the influence of the cam 74. This brings the central book support 94 into contact with the book. Substantially at this moment the slide 93 commences it forward movement under the influence of the cam 95. As the slide advances, the rollers 108 come in contact with the cams 81 and the brackets 100, carrying the cover breaker jaws 101, are moved inwardly into contact with the cover. When the rollers 108 have passed the cams 81 the cover breaker jaws recede. After that the guide comprising shafts 66 and elements carried thereby drops down, and the slide 93 returns to its original position. In order to prevent displacement of the slide with reference to the book clamp as they travel in unison, there is provided a stop 109 on the slide 93 which comes in contact with the stop 110 on the book clamp. These two stops virtually secure the two members together while they travel in unison. The book continues its onward travel until it reaches the delivery chute 10. Here the book clamp opens and the book travels down the chute, whereby the cover flaps are closed up around the book. The chute 10 is inclined as shown, and leads down to the trough 111 of the stacker. Located in the chute 10 is an endless conveyer 112 provided with laterally projecting pins 113 which engage with the books and feed them downward.

203 is a supporting shaft carried by the framework and provided with a bracket 204 which forms a support for the shelf 55 adjacent to the chute 10. This shaft also carries a bearing 205 for the shaft 206 of the chute delivery mechanism. The stacker consists of the trough 111 and a vibrating stacker blade 114 mounted on the shaft 115. This stacker blade gradually moves the books out through the trough 111. In order to prevent the blade from adhering to the books on account of air pressure, perforations 116 are provided. To hold the books already stacked and to prevent them from becoming displaced there is provided a separator 117, mounted on the shaft 118, which moves down and holds the books while the stacker blade recedes.

Motion may be imparted to the various devices, comprising the machine, in many ways. In the form here shown there is a main shaft 75 extending longitudinally underneath the machine. At the forward end of this shaft is a sprocket wheel 119 which drives the sprocket wheel 120 by means of the chain 121. The sprocket 120 has a crank connection 122 with the shaft 123 carrying the bevel gear 124 meshing with the bevel gear 125 on the upright shaft 126. The shaft 126 carries a sprocket 127 which drives the chain 26 of the book feeding device. (See Figs. 1 and 3). At the other end of the main shaft 75 is a bevel pinion 128 meshing with the bevel gear 129 on the upright shaft 130, which latter carries the sprockets 2 and 3 of the book conveyer. The sprockets 2 and 3 of the book conveyer at the forward end of the machine are mounted on a rotatable shaft 131 having no driving connection with the main shaft except through the book conveyer, and these forward sprockets are therefore merely idlers. (See Figs. 1 and 2).

Mounted substantially midway of the main shaft is a bevel gear 132 which engages with a bevel gear 133 on the transverse shaft 134 having the sprocket 135. A chain 136 passes from this sprocket 135 up to the sprocket 137 on the shaft 31, thereby driving the glue roller. (See Figs. 1, 7, 9 and 10). Mounted on the shaft 134 is further a gear 138 meshing with the pinion 139 swung on the arm 140 of the shaft 141. The pinion 139 meshes with the gear 142 on the shaft 141, which gear 142 meshes with the gear 143 of the cover drum. By these means motion is imparted to the cover drum and to the conveyer 39. (See Figs. 7, 9 and 10). Mounted on the shaft 134 is another sprocket 144 which imparts motion to the shaft 145 by means of the chain 146 and sprocket 147. On the shaft 145 is another sprocket 148 which imparts motion to the sprocket 149 on the shaft 150 by means of the chain 151. The shaft 150 has a gear 152 meshing with a gear 153 which latter meshes with the pinion 154, on the shaft 49, and with the gear 155. Gear 155 in turn meshes with the pinion 156, on the shaft 43, and with the gear 157 on the shaft 42. (See Figs. 1, 2, 4, 5, 7, 9 and 10). Mounted on the main shaft 75 is further an eccentric 158 connected by means of the rod 159 to the rock arm 160, on the rockshaft 115, which thus serves to vibrate the stacker blade 114. (Figs. 3 and 11).

Adjacent to the eccentric 158 is a cam 161 with which engages the cam roll 162 of the arm 163. This arm 163 is mounted on the stud 118 and is connected to the separator 117. (Figs. 3 and 11). The shaft 145 extends across the machine and carries a sprocket 164 which communicates motion to the sprocket 165 by means of the chain 166. The sprocket 165 is mounted on the stud 167 which also carries another sprocket 168 over which the chain 112 passes. This chain 112 passes over the sprocket 169 on the shaft 206 at its other end. (See Fig. 11).

170 indicates a cam bolted to the framework which opens the book clamps. This cam starts at a point just before the book clamps reach the chute 10. The shape of the cam is such that it acts on the roller 17 to open the book clamp just as the said clamp reaches the delivery chute 10. The clamp is opened gradually and continues in its open position until it almost reaches the point where the books are fed in when by reason of the shape of the cam 170 it is opened still farther and then closes quickly by reason of the abrupt change in the shape of the cam.

Above the glue roller and above the cover breaker are two cams 171 and 172 which are pivoted at 173 and 174. Both of these cams are constructed alike and both act to assist the springs 16 in keeping the book clamps closed while the glue roller and cover breaker act upon the book. In fact, they prevent the clamps from opening and the springs 16 from yielding. Each cam 171 and 172 is provided with an arm 175 which is held under tension by the spring 176 surrounding the rod 177.

In Figs. 16 and 17 are illustrated certain modifications of the cover breaker and presser. In these figures the cover drum 178 is shown located beneath the path 179 of the back of the book. The cover in this instance is not applied to the back of the book by the cover drum, but is carried forward by the conveyer 180. In Fig. 16, the member 181 indicates a cover breaker such as is shown in Figs. 7, 8, and 9. This cover breaker would, in this instance, therefore also act as a cover presser and would lift the cover off the conveyer 180 into contact with the book. In Fig. 17, 181 indicates the same cover breaker as shown in Fig. 16, but in addition thereto there is a cover presser 182. This cover presser member 182 raises the cover off the conveyer and presses it into contact with the book, while the member 181 breaks the cover as usual.

I claim:

1. A book covering machine comprising, a traveling conveyer, movable book clamping jaws carried by the conveyer arranged to have an opening and closing movement at an angle with respect to the movement of the conveyer, means for opening and closing the jaws, means for feeding books in substantially the same direction with the traveling movement of the conveyer into position beneath the open jaws, and means for applying covers to the books held in the jaws.

2. A book covering machine comprising, a conveyer having a continuous advancing movement, movable book clamping jaws carried by the conveyer and arranged to have an opening and closing movement at an angle with respect to the movement of the conveyer, means for opening and closing the jaws, means for feeding books in substantially the same direction with the traveling movement of the conveyer into position beneath the open jaws, and means for applying covers to the books held in the jaws, while the books are traveling.

3. A book covering machine comprising, a traveling conveyer, movable book clamping jaws carried by the conveyer arranged to have an opening and closing movement at an angle with respect to the movement of the conveyer, means for opening and closing the jaws, means for feeding books in an upright position and in substantially the same direction with the traveling movement of the conveyer into position beneath the open jaws, and means for applying covers to the books held in the jaws.

4. A book covering machine comprising, a conveyer having a continuous advancing movement, book clamping jaws carried by the conveyer having an opening and closing movement at an angle with respect to the advancing movement of the conveyer, means for opening and closing the jaws, means for feeding books in an upright position and in substantially the same direction with the traveling movement of the conveyer into position beneath the open jaws, and means for applying covers to the books held in the jaws, while the books are traveling.

5. In a book covering machine, a book conveyer having a longitudinal advancing movement, means for feeding a cover in the same direction as the movement of the book conveyer, and gages on the book conveyer and cover feeding means for bringing the book and cover into register.

6. In a book covering machine, a book conveyer having a continuous advancing movement, means for feeding a cover in the same direction as the movement of the book conveyer, and gages on the book conveyer and cover feeding means for bringing the book and cover into register.

7. In a book covering machine, a traveling book clamp, adhesive applying means located underneath the book clamp, a cover drum in the rear of the adhesive applying means, means for raising and lowering the adhesive applying means, and a detector controlled by the sheet on the cover drum acting in the absence of a sheet to interrupt the operation of the means for raising and lowering the adhesive applying means.

8. In a book covering machine, a book conveyer, a glue roller located in the path of the book conveyer and having a movement toward and away from the same, cover feeding means, and detector mechanism adapted to detect the absence of a cover in said feeding means and having connection with the glue roller to render the same inoperative under such conditions.

9. In a book covering machine, a book clamp and a glue roller having a coöperative relative movement, one with respect to the other, cover feeding means, and detector mechanism adapted to detect the absence of a cover in the feeding means and adapted thereupon to prevent the coöperative movement of the book clamp and glue roller.

10. In a book covering machine, a traveling book clamp and means for holding the same closed upon a book in the grip thereof, adhesive applying means located in the path of the clamp, cover applying mechanism located in the path of the clamp, and means for applying additional pressure to the clamp while traveling past the adhesive applying means and cover applying mechanism.

11. In a book covering machine, the combination with a traveling book clamp, means normally holding the clamp closed, means for opening the clamp to receive a book, a glue roller located in the path of the clamp, and means for applying additional pressure to the clamp while traveling past said glue roller.

12. The combination in a book covering machine, of a traveling book clamp and means for holding the same closed upon a book in the grip thereof, adhesive applying means located in the path of the clamp, and means for applying additional pressure to the clamp while the same is traveling past said adhesive applying means.

13. A book covering machine comprising, a book support, an inclined chute terminating said book support, a traveling book clamp above the book support, means for feeding books to the book clamp, means for applying a cover to the book held in the book clamp, and means for opening the book clamp when it reaches the inclined chute to deliver the book thereto.

14. A book covering machine comprising, a book support, an inclined chute terminating said book support, a traveling book clamp above the book support, means for feeding books to the book clamp, means for applying a cover to the book held in the book clamp, means for opening the book clamp when it reaches the inclined chute to deliver a book thereto, and an inclined conveyer located in said chute.

15. A book covering machine comprising, a traveling book clamp, means for feeding books to the book clamp, means for applying a cover to the book held in the book clamp, an inclined delivery chute located below the clamp, means for opening the clamp when it reaches the inclined chute to permit the book to travel down said chute, a trough for receiving the books from the chute, and means for stacking said books transversely in the trough.

16. A book covering machine comprising, a book support, an inclined chute terminating said book support, a traveling book clamp above the book support, means for feeding books to the book clamp, means for applying a cover to the book held in the book clamp, means for opening the book clamp when it reaches the inclined chute to deliver the book thereto, a trough for receiving the books from the chute, and means for stacking said books transversely in the trough.

17. A book covering machine comprising, a traveling book clamp, means for feeding books to said book clamp, means for applying a cover to the book held in the book clamp, an inclined delivery chute located below the clamp, means for opening the clamp when it reaches the inclined chute to permit the book to travel down said chute, an inclined conveyer located in said chute, a trough for receiving the books from the chute, and means for stacking said books transversely in the trough.

18. A book covering machine comprising, a book support, an inclined chute terminating said book support, a traveling book clamp above the book support, means for feeding books to the book clamp, means for applying a cover to the book held in the book clamp, means for opening the book clamp when it reaches the inclined chute to deliver the book thereto, an inclined conveyer located in said chute, a trough for receiving the books from the chute, and means for stacking said books transversely in the trough.

19. A book covering machine comprising, a book conveyer having an advancing movement, means mounted independently of the conveyer for acting on the cover of the book, means for causing said first means to travel in unison with the book conveyer, means for moving the book conveyer and said first means one into relation with the other, and complementary stops carried by the book conveyer and said first means respectively, adapted to engage each other to prevent the book conveyer and said first means from slipping one with relation to the other.

20. A book covering machine comprising, a continuously moving book conveyer, means for applying adhesive to the books carried by the conveyer, means located adjacent to the path of the conveyer for feeding covers to the books carried by the conveyer, a cover breaking device located adjacent to the path of the conveyer, means for causing the cover breaking device to engage and break the cover, and means for moving the cover breaking device in unison with the advancing movement of the conveyer while breaking the cover.

21. A book covering machine comprising, a traveling book conveyer, means for applying adhesive to the books carried by the conveyer, means located adjacent to the path of the conveyer for feeding covers to the books carried by the conveyer, a cover breaking device located adjacent to the path of the conveyer and having jaws moving from opposite sides of the conveyer inwardly toward each other, and means for moving the cover breaking device in unison with the advancing movement of the conveyer when the jaws move inwardly toward each other.

22. A book covering machine comprising, a continuously moving book conveyer, means for applying adhesive to the books carried by the conveyer, means located adjacent to the path of the conveyer for feeding covers to the books carried by the conveyer, a cover breaking device located adjacent to the path of the conveyer and having jaws moving from opposite sides of the conveyer inwardly toward each other, and means for moving the cover breaking device in unison with the advancing movement of the conveyer when the jaws move inwardly toward each other.

23. A book covering machine comprising, a plurality of traveling book clamps, said clamps having jaws hinged at their upper edges and thereby adapted to grasp the books fed thereto in an upright position, means located adjacent to the path of the clamps for feeding the books in an upright position to the said clamps in substantially the same direction as the direction of travel of the clamps, means located adjacent to the path of the clamps for feeding covers to the books, and means for associating the books with the covers.

24. A book covering machine comprising, a book conveyer traveling in a direction longitudinally of the machine, adhesive-applying means located adjacent to the path of the book conveyer, a drum located adjacent to the book conveyer and underneath the same, an endless cover feeding conveyer moving in a vertical plane also located underneath the book conveyer, extending longitudinally thereof and passing over the drum, the upper side of said cover feeding conveyer traveling in the same direction as the book conveyer, and cover breaking means located underneath the book conveyer and adjacent to the cover conveyer.

25. A book covering machine comprising, a book conveyer traveling in a direction longitudinally of the machine, adhesive applying means located adjacent to the path of the book conveyer, an endless cover conveyer moving in a vertical plane located adjacent to the book conveyer and extending longitudinally thereof underneath the same, the upper side of said conveyer traveling in the same direction as the book conveyer, and cover breaking means located underneath the book conveyer and adjacent to the cover conveyer.

26. A book covering machine comprising, a traveling book conveyer, adhesive applying means, means located adjacent to the path of the conveyer for feeding covers to the books carried by the conveyer, a cover breaker, having jaws, adjacent the path of the conveyer, means for imparting to said cover breaker a movement toward and away from the book conveyer and a movement in unison with and in the same direction as the advancing movement of the book conveyer, and means for moving the jaws of the cover breaker toward each other into engagement with the cover.

27. A book covering machine comprising, a continuously traveling book conveyer, adhesive applying means, means located adjacent to the path of the conveyer for feeding covers to the books carried by the conveyer, a cover breaker, having jaws, adjacent the path of the conveyer, means for imparting to said cover breaker a movement toward and away from the book conveyer and a movement in unison with and in the same direction as the advancing movement of the book conveyer, and means for moving the jaws of the cover breaker toward each other into engagement with the cover.

28. In a book covering machine, a continuously traveling book conveyer moving in a horizontal path, a pair of cover breaking jaws arranged on opposite sides of the conveyer, means for imparting a horizontal reciprocating motion to said jaws longitudinally of the path of the conveyer, means for imparting a vertical rising and falling motion to the jaws, and means for imparting a transverse movement to the jaws so as to cause them to approach and recede from each other laterally.

29. In a book covering machine, a cover breaker comprising two opposed cover breaking jaws, means for imparting a horizontal reciprocating motion in a longitudinal direction to said jaws, means for imparting a vertical rising and falling motion to said jaws, and means for imparting a transverse horizontal movement to the jaws so as to cause them to approach and recede from each other laterally.

30. In a book covering machine, a cover breaker comprising a guide, means for lifting and lowering said guide, a slide, means for reciprocating said slide longitudinally on the guide, cover breaking jaws carried by the slide, and means for transversely reciprocating said cover breaking jaws.

31. In a book covering machine, a book conveyer having a longitudinal advancing movement, a pair of cover breaking jaws, means for imparting a reciprocating motion to said jaws longitudinally of the path of the conveyer, means for causing them to rise vertically prior to the stroke of the said jaws in the direction of the advancing movement of the book conveyer, and means for imparting a lateral motion to said jaws toward each other as they travel in the direction of the advancing movement of the conveyer.

32. In a book covering machine, a book clamp, adhesive applying means, means for causing the book clamp and adhesive applying means to approach each other, cover feeding means, and means controlled by the sheet on the cover feeding means acting in the absence of a sheet to interrupt the operation of the means for causing the book clamp and adhesive applying means to approach each other.

33. A book covering machine comprising a plurality of book clamps mounted to have an advancing movement, book feeding means located to feed books to the clamps in substantially the direction of the path of movement of said clamps, means for causing the clamps to seize the books as the said clamps reach the point at which the books are fed, adhesive applying means located adjacent to the path of the clamps engaging the backs of the books held in the clamps, cover applying means located adjacent to the path of the clamps for carrying the covers into engagement with the adhesive backs of the books held by the clamps, cover breaking means located to act on the covers so applied to the books and having a movement in unison with the advancing movement of the clamps while breaking the covers, and means for opening the book clamps to discharge the covered books therefrom.

34. A book covering machine comprising, a plurality of book clamps mounted to have an advancing movement in an endless path, said clamps having vertical jaws hinged at their upper edges, means for opening the clamping jaws at a predetermined point, book feeding means located to feed the books in an upright position to the clamps in substantially the direction of the path of movement of the clamps at a point beneath the clamping jaws while in their open position, means for causing the clamps to seize the books, and means for applying the covers to the books held in the clamps.

35. A book covering machine comprising an endless book conveyer having two substantially parallel sides and traveling in a horizontal plane, adhesive applying means, cover feeding means and cover breaking means, all located adjacent to one of the said parallel sides of said conveyer, and means disposed at the opposite parallel side of the conveyer for causing the books to be discharged therefrom.

36. In a book covering machine, a plurality of book clamps forming a conveyer having two substantially parallel sides and traveling in a horizontal plane, book feeding means, cover feeding means and means for associating the books and covers, all located adjacent to one of the parallel sides of the conveyer, means for causing the clamps to seize the books as they are fed thereto by the book feeding means, means disposed on the opposite parallel side of the conveyer for opening the book clamps to discharge the books therefrom when the books have been carried around to the opposite side of the machine, and a shelf on which the backs of the books slide as they are carried around by the clamps disposed beneath the horizontal path of the clamps and extending substantially from the means for associating the books and covers on one of the parallel sides of the conveyer around to the other parallel side of the conveyer to the point of discharge of the books.

37. In a book covering machine, an endless conveyer having two substantially parallel sides, means for imparting an advancing movement to the conveyer in a horizontal plane, book clamps carried by the conveyer, book feeding means located to feed the books to the clamps in a path substantially coinciding with one of the parallel sides of the conveyer, adhesive applying means located beneath the conveyer in the rear of the book feeding means, cover feeding means located adjacent to the conveyer and in the rear of the adhesive applying means for carrying the covers into engagement with the adhesive backs of the books held by the clamps, cover breaking means located adjacent to the conveyer and in the rear of the cover feeding means, said adhesive applying means, cover feeding means and cover breaking means being located at one of the parallel sides of the conveyer, and means disposed at the opposite parallel side of the conveyer for opening the book clamps to discharge the books therefrom when the books have been thus carried around the opposite side of the machine.

38. In a book covering machine, an endless conveyer having two substantially parallel sides, means for imparting an advancing movement to the conveyer in a horizontal plane, book clamps carried by the conveyer, book feeding means located to feed the books to the clamps in a path substantially coinciding with one of the parallel sides of the conveyer, adhesive applying means in the rear of the book feeding means, cover feeding means located adjacent to the conveyer and in the rear of the adhesive applying means for carrying the cover into engagement with the adhesive backs of the books held by the clamps, cover breaking means located adjacent to the conveyer and in the rear of the cover feeding means, said adhesive applying means, cover feeding means, and cover breaking means being located at one of said parallel sides of the conveyer, means disposed at the opposite parallel side of the conveyer for opening the book clamps to discharge the books therefrom when the books have been thus carried around the opposite side of the machine, and a shelf disposed beneath the conveyer on which the books held by the clamps of the conveyer slide extending substantially from the cover breaking means around to the point of discharge of the books.

39. In a book covering machine, a book conveyer traveling in a definite path, a drum having its peripheral surface so disposed that the line of movement of the backs of the books carried by the book conveyer is tangent to the drum whereby to press the covers into firm engagement with the backs of the books held in the book conveyer, and means for feeding covers to said drum.

40. In a book covering machine, a book conveyer traveling in a definite path, an endless cover conveyer arranged to carry the covers into engagement with the backs of the books carried by the conveyer, and a rotating drum around which the cover conveyer passes so mounted that the line of movement of the books held in the conveyer is tangent to the drum, whereby to press the covers into firm engagement with the backs of the books carried by the conveyer.

41. In a book covering machine, a book conveyer traveling in a definite path, adhesive applying means arranged to apply an adhesive to the backs of the books held in the conveyer, a drum having its peripheral surface so disposed that the line of movement of the backs of the books carried by the book conveyer is tangent to the drum whereby to press the covers into firm engagement with the backs of the books held in the book conveyer, and means for feeding covers to said drum.

42. In a book covering machine, a book conveyer traveling in a definite path, adhesive applying means arranged to apply an adhesive to the backs of the books held in the conveyer, a cover feeding means arranged to carry the covers into engagement with the adhesive backs of the books, a drum so disposed that the line of movement of the backs of the books carried by the conveyer is tangent to the drum whereby to press the covers into intimate engagement with the backs of the books, and a supporting shelf disposed beneath the book conveyer and extending substantially from the point at which the covers are applied to the backs of the books the length of one or more books.

43. A book covering machine comprising, the combination with a book conveyer traveling in a definite path, of a drum having its peripheral surface so disposed that the line of movement of the backs of the books carried by the book conveyer is tangent to the drum and arranged thereby to press the covers into firm engagement with the backs of the books, and means for feeding covers between the backs of the books and the drum.

44. A book covering machine comprising, the combination with a book conveyer traveling in a definite path, of a cover presser having its peripheral surface so disposed that the line of movement of the backs of the books carried by the book conveyer is tangent to the cover presser, said cover presser moving when pressing the cover in the same direction with the advancing movement of the book conveyer and arranged to press each cover progressively along its full length into engagement with the back of the book and means for feeding covers between the backs of the books and the cover presser.

45. A book covering machine comprising, the combination with a book conveyer traveling in a definite path, of a cover presser disposed beneath the book conveyer so that the line of movement of the backs of the books carried by the book conveyer is tangent to the upper surface of the cover presser, said cover presser arranged to receive the covers on its surface and to carry the covers up into engagement with the backs of the books, and means for feeding covers between the backs of the books and the cover presser.

46. A book covering machine comprising, the combination of a book conveyer traveling in a definite path, a cover presser so disposed that the line of movement of the backs of the books carried by the book conveyer is tangent to the peripheral surface of the cover presser, and cover feeding means associated with the cover presser whereby said cover presser will press the covers into engagement with the backs of the books in the conveyer.

47. A book covering machine comprising, the combination of a traveling conveyer, dependent book-clamping jaws carried by the conveyer and hinged at their upper edges to the said conveyer, means for swinging the jaws on their hinges to open them at an angle with respect to the movement of the conveyer, means for feeding books in substantially the same direction with the traveling movement of the conveyer into position beneath the open jaws, means for closing the jaws upon the books, and means for applying covers to the books held in the jaws.

48. A book covering machine comprising, the combination of a conveyer having a continuous advancing movement, dependent book-clamping jaws carried by the conveyer and hinged at their upper edges to the said conveyer, means for swinging the jaws on their hinges to open them at an angle with respect to the movement of the conveyer, means for feeding books in substantially the same direction with the traveling movement of the conveyer into position beneath the open jaws, means for closing the jaws upon the books, and means for applying covers to the books held in the jaws.

49. A book covering machine comprising, the combination of a conveyer having a continuous advancing movement, dependent book-clamping jaws carried by the conveyer and hinged at their upper edges to said conveyer, means for swinging the jaws on their hinges to open them at an angle with respect to the movement of the conveyer, continuously operating book feeding means arranged to feed the books in substantially the same direction with the traveling movement of the conveyer into position beneath the open jaws, means for closing the jaws upon the books, and means for applying covers to the books held in the jaws.

50. A book covering machine comprising, the combination of a conveyer arranged to travel in a substantially horizontal plane, dependent book-clamping jaws hinged at their upper edges to the conveyer, means for swinging the said jaws on their hinges outwardly and upwardly into open position, means for feeding books in substantially the same direction with the advancing movement of the conveyer into position beneath the open jaws, means for closing the jaws upon the books, and means for applying covers to the books held in the jaws.

51. A book covering machine comprising, the combination of a conveyer having a continuous advancing movement and arranged to travel in a substantially horizontal plane, dependent book-clamping jaws hinged at their upper edges to the conveyer, means for swinging the said jaws on their hinges outwardly and upwardly into open position, continuous book feeding means arranged to feed books in an upright position and in substantially the same direction with the advancing movement of the conveyer into position beneath the open book-clamping jaws, means for closing the jaws upon the books, and means for applying covers to the books held in the jaws.

52. In a book covering machine, the combination of a traveling book conveyer, cover feeding means arranged to feed covers to the books carried by the conveyer, adhesive applying means, and detector mechanism arranged to detect the absence of a cover in the feeding means and adapted thereupon to prevent the operation of the adhesive applying means.

53. In a book covering machine, a traveling book conveyer, and adhesive applying means, having a coöperative relative movement one with respect to the other, whereby to apply adhesive to the book carried by the book conveyer, cover feeding means, and detector mechanism arranged to detect the absence of a cover in the feeding means and adapted thereupon to prevent the application of the adhesive to the book in the book conveyer.

54. The combination in a book covering machine, of a traveling book clamp and means for holding the same closed upon a book in the grip thereof, cover applying mechanism located in the path of the clamp, and means for applying additional pressure to the clamp while traveling past the cover applying mechanism.

55. A book covering machine comprising a traveling book conveyer, means for feeding covers to the books carried by the conveyer, a cover breaking device located adjacent to the path of the conveyer, means for causing the cover breaking device to engage and break the cover, and means for moving the cover breaking device in unison with the advancing movement of the conveyer while breaking the cover.

56. A book covering machine comprising, a book conveyer traveling in a definite path, cover pressing means disposed substantially in the line of movement of the backs of the books carried by the book conveyer for progressively applying and pressing the cover into engagement with the back of the book, and means for feeding covers to the cover pressing means.

57. A book covering machine comprising, a book conveyer traveling in a definite path, adhesive applying means adapted to apply an adhesive to the backs of the books carried by the conveyer, cover-pressing means disposed substantially in the line of movement of the backs of the books carried by the book conveyer for progressively applying and pressing the cover into engagement with the back of the book, and means for feeding covers to the cover pressing means.

58. A book covering machine comprising: a plurality of book clamps, for supporting books in an upright position with their backs exposed, forming a traveling conveyer, means for imparting a continuous motion to said conveyer, and cover applying means, located adjacent to said conveyer to act on the books while traveling in the clamps of the conveyer, including: adhesive applying means, cover feeding means, and cover breaking jaws having a movement substantially in synchronism with the advance of the conveyer while breaking the cover.

59. A book covering machine comprising: a plurality of book clamps, for supporting books in an upright position with their backs exposed, forming a traveling conveyer, means for imparting a continuous motion to said conveyer, and cover applying means, located adjacent to said conveyer to act on the books while traveling in the clamps of the conveyer, including: adhesive applying means, cover feeding means for feeding a cover to the book in the same direction as the travel of the conveyer when passing the cover feeding means, and cover breaking jaws having a movement substantially in synchronism with the advance of the conveyer while breaking the cover.

60. A book covering machine comprising: a plurality of book clamps, for supporting books in an upright position with their backs exposed, forming a traveling conveyer, means for imparting a continuous motion to said conveyer, book feeding means for feeding books in a substantially upright position to said clamps while the conveyer is advancing, means for causing the clamps to close on the books when passing the book feeding means and for opening the clamps to discharge the books after the cover has been applied, and cover applying means, located adjacent to said conveyer to act on the books while traveling in the clamps of the conveyer, including: adhesive applying means, cover feeding means, and cover breaking jaws having a movement substantially in synchronism with the advance of the conveyer while breaking the cover.

61. A book covering machine comprising: a plurality of book clamps, for supporting books in an upright position with their backs exposed, forming a traveling conveyer, means for imparting a continuous motion to said conveyer, book feeding means for feeding books in a substantially upright position to said clamps while the conveyer is advancing, means for causing the clamps to close on the books when passing the book feeding means and for opening the clamps to discharge the books after the cover has been applied, and cover applying means, located adjacent to said conveyer to act on the books while traveling in the clamps of the conveyer, including: adhesive applying means, cover feeding means for feeding a cover to the book in the same direction as the travel of the conveyer when passing the cover feeding means, and cover breaking jaws having a movement substantially in synchronism with the advance of the conveyer while breaking the cover.

62. A book covering machine comprising: a plurality of book clamps for supporting books in an upright position, forming a conveyer having two substantially parallel sides and traveling in a horizontal plane, means for imparting a continuous motion to said conveyer, and cover applying means, located adjacent to said conveyer to act on the books while traveling in the clamps of the conveyer, including: adhesive applying means, cover feeding means, and cover breaking jaws having a movement substantially in synchronism with the advance of the conveyer while breaking the cover.

63. A book covering machine comprising: a plurality of book clamps for supporting books in an upright position, forming a conveyer having two substantially parallel sides and traveling in a horizontal plane, means for imparting a continuous motion to said conveyer, and cover applying means, located adjacent to said conveyer to act on the books while traveling in the clamps of the conveyer, including: adhesive applying means, cover feeding means for feeding a cover to the book in the same direction as the travel of the conveyer when passing the cover feeding means, and cover breaking jaws having a movement substantially in synchronism with the advance of the conveyer while breaking the cover.

64. A book covering machine comprising: a plurality of book clamps, for supporting books in an upright position, forming a conveyer having two substantially parallel sides and traveling in a horizontal plane, book feeding means for feeding books in a substantially upright position to said clamps, while the conveyer is advancing, adjacent to substantially the beginning of one of the parallel sides of the conveyer, means for causing the clamps to close on the books when passing the book feeding means and for opening the clamps to discharge the books after the cover has been applied, and cover applying means located adjacent to said conveyer to act on the books while traveling in the clamps of the conveyer, including: adhesive applying means, cover feeding means, and cover breaking jaws having a movement substantially in synchronism with the advance of the conveyer while breaking the cover.

65. A book covering machine comprising:

a plurality of book clamps, for supporting books in an upright position, forming a conveyer having two substantially parallel sides and traveling in a horizontal plane, book feeding means for feeding books in a substantially upright position to said clamps, while the conveyer is advancing, adjacent to substantially the beginning of one of the parallel sides of the conveyer, means for causing the clamps to close on the books when passing the book feeding means and for opening the clamps to discharge the books after the cover has been applied, and cover applying means located adjacent to said conveyer to act on the books while traveling in the clamps of the conveyer, including: adhesive applying means, cover feeding means for feeding a cover to the book in the same direction as the travel of the conveyer when passing the cover feeding means, and cover breaking jaws having a movement substantially in synchronism with the advance of the conveyer while breaking the cover.

66. A book covering machine comprising: a plurality of book clamps, for supporting books in an upright position, forming a conveyer having two substantially parallel sides and traveling in a horizontal plane, book feeding means for feeding books in a substantially upright position to said clamps, while the conveyer is advancing, adjacent to substantially the beginning of one of the parallel sides of the conveyer, delivery means for the covered books located adjacent to the other side of the conveyer, means for causing the clamps to close on the books when passing the book feeding means and for opening the clamps to discharge the books when passing the delivery means, and cover applying means located adjacent to said conveyer to act on the books while traveling in the clamps of the conveyer, including: adhesive applying means, cover feeding means, and cover breaking jaws having a movement substantially in synchronism with the advance of the conveyer while breaking the cover.

67. A book covering machine comprising: a plurality of book clamps, for supporting books in an upright position, forming a conveyer having two substantially parallel sides and traveling in a horizontal plane, book feeding means for feeding books in a substantially upright position to said clamps, while the conveyer is advancing, adjacent to substantially the beginning of one of the parallel sides of the conveyer, delivery means for the covered books located adjacent to the other side of the conveyer, means for causing the clamps to close on the books when passing the book feeding means and for opening the clamps to discharge the books when passing the delivery means, and cover applying means located adjacent to said conveyer to act on the books while traveling in the clamps of the conveyer, including: adhesive applying means, cover feeding means for feeding a cover to the book in the same direction as the travel of the conveyer when passing the cover feeding means, and cover breaking jaws having a movement substantially in synchronism with the advance of the conveyer while breaking the cover.

68. A book covering machine comprising: a plurality of book clamps, for supporting books in an upright position with their backs lowermost, forming a traveling conveyer, means for imparting a continuous advancing movement to said conveyer, and cover applying means, located adjacent to said conveyer to act on the books while traveling in the clamps of the conveyer, including: adhesive applying means, cover feeding means, a centrally disposed support below the conveyer, means for raising said support to engage the back of the book when the latter is passing over said support, oppositely disposed cover breaking jaws adjacent the central support, and means for imparting a movement to said jaws and support while acting on the book substantially in synchronism with the advancing movement of the conveyer.

69. A book covering machine comprising: a plurality of book clamps, for supporting books in an upright position with their backs lowermost, forming a traveling conveyer, means for imparting a continuous advancing movement to said conveyer, and cover applying means, located adjacent to said conveyer to act on the books while traveling in the clamps of the conveyer, including: adhesive applying means, cover feeding means for feeding a cover to the book in the same direction as the travel of the conveyer when passing the cover feeding means, a centrally disposed support below the conveyer, means for raising said support to engage the back of the book when the latter is passing over said support, oppositely disposed cover breaking jaws adjacent the central support, and means for imparting a movement to said jaws and support while acting on the book substantially in synchronism with the advancing movement of the conveyer.

70. A book covering machine comprising: a plurality of book clamps, for supporting books in an upright position with their backs lowermost, forming a traveling conveyer, means for imparting a continuous advancing movement to said conveyer, book feeding means for feeding books in a substantially upright position to said clamps while the conveyer is advancing, means for causing the clamps to close on the books when passing the book feeding means and for opening the clamps to discharge the books after the cover has been applied, and cover applying means, located adjacent to said conveyer to act on the books while traveling in the clamps of the conveyer, including: adhesive applying means, cover feeding means, a centrally disposed support below the conveyer, means for raising said support to engage the back of the book when the latter is passing over said support, oppositely disposed cover breaking jaws adjacent the central support, and means for imparting a movement to said jaws and support while acting on the book substantially in synchronism with the advancing movement of the conveyer.

71. A book covering machine comprising: a plurality of book clamps, for supporting books in an upright position with their backs lowermost, forming a traveling conveyer, means for imparting a continuous advancing movement to said conveyer, book feeding means for feeding books in a substantially upright position to said clamps while the conveyer is advancing, means for causing the clamps to close on the books when passing the book feeding means and for opening the clamps to discharge the books after the cover has been applied, and cover applying means located adjacent to said conveyer to act on the books while traveling in the clamps of the conveyer, including: adhesive applying means, cover feeding means for feeding a cover to the book in the same direction as the travel of the conveyer when passing the cover feeding means, a centrally disposed support below the conveyer, means for raising said support to engage the back of the book when the latter is passing over said support, oppositely disposed cover breaking jaws adjacent the central support, and means for imparting a movement to said jaws and support while acting on the book substantially in synchronism with the advancing movement of the conveyer.

72. A book covering machine comprising: a book conveyer for supporting books in an upright position with their backs lowermost, means for advancing said conveyer continuously, a centrally disposed book support located adjacent to the path of the conveyer and below the same and adapted to engage the back of the book when the latter is passing over said support, oppositely disposed cover breaking jaws adjacent the conveyer and the central support, and means for imparting a movement to said jaws and support while acting on the book substantially in synchronism with the advancing movement of the conveyer.

73. A book covering machine comprising: a book conveyer for supporting books in an upright position with their backs lowermost, means for advancing said conveyer continuously, a centrally disposed book support located adjacent to the path of the conveyer and below the same, means for raising and lowering said support and for reciprocating the same, and oppositely disposed cover-breaking jaws, adjacent the conveyer and the central support, having a movement substantially in synchronism with the advancing movement of the conveyer.

74. A book covering machine comprising: a book conveyer for supporting books in an upright position with their backs lowermost, means for advancing said conveyer continuously, a guide underneath the conveyer, means for raising and lowering said guide, a slide reciprocating in said guide and centrally disposed under said conveyer for supporting the books during cover breaking, and oppositely disposed cover breaking jaws adjacent the conveyer and slide, having a movement substantially in synchronism with the advancing movement of the conveyer.

75. A book covering machine comprising: a plurality of book clamps, for supporting books in an upright position with their backs exposed, forming a conveyer, cover breaking means located adjacent to the conveyer to act on the books held in the clamps, and cover feeding devices located under the cover breaking means and extending up to the path of the conveyer in front of the cover breaking means.

76. A book covering machine comprising: a plurality of book clamps, for supporting books in an upright position with their backs lowermost, forming a conveyer traveling in a horizontal plane, cover breaking means located adjacent to the conveyer to act on the books held in the clamps, and cover feeding devices located under the cover breaking means and extending up to the path of the conveyer in front of the cover breaking means to deliver a cover in the same direction as the direction of movement of the conveyer when passing the said feeding means.

77. A book covering machine comprising: a plurality of book clamps, for supporting books in an upright position with their backs exposed, forming a conveyer, adhesive applying means and cover breaking means both located adjacent to the conveyer to act on the books held in the clamps, and cover feeding devices located under the cover breaking means and extending up to the path of the conveyer between the adhesive applying means and the cover breaking means.

78. A book covering machine comprising: a plurality of book clamps, for supporting books in an upright position with their backs lowermost, forming a conveyer traveling in a horizontal plane, adhesive applying means and cover breaking means both located adjacent to the conveyer to act on the books held in the clamps, and cover feeding devices located under the cover breaking means and extending up to the path of the conveyer between the adhesive applying means and the cover breaking means to deliver a cover in the same direction as the direction of movement of the conveyer when passing the said feeding means.

79. A book covering machine comprising: a plurality of book clamps, for supporting books in an upright position with their backs exposed, forming a conveyer traveling in a horizontal plane, cover breaking means located adjacent to the path of the conveyer, a source of supply of covers, and cover feeding means for feeding covers singly from the source of supply underneath the cover breaking means and upwardly to the path of the conveyer.

80. A book covering machine comprising: a plurality of book clamps, for supporting books in an upright position with their backs exposed, forming a conveyer traveling in a horizontal plane, adhesive applying means and cover breaking means located adjacent to the path of the conveyer, a source of supply of covers, and cover feeding means for feeding covers singly from the source of supply underneath the cover breaking means and upwardly to the path of the conveyer between the adhesive applying means and the cover breaking means.

81. A book covering machine comprising: a plurality of book clamps, for supporting books in an upright position with their backs exposed, forming a conveyer having two substantially parallel sides and traveling in a horizontal plane, means for feeding books in a substantially upright position to said conveyer adjacent to one of the parallel sides thereof, a source of supply of covers located adjacent the same side of the conveyer, cover-breaking means located adjacent to the path of the conveyer and intermediate the book feeding means and the source of supply of covers, and cover feeding means for feeding covers singly from the source of supply underneath the cover breaking means and upwardly to the path of the conveyer between the cover breaking means and the book feeding means.

82. A book covering machine comprising: a plurality of book clamps for supporting books in an upright position with their backs exposed, forming a conveyer having two substantially parallel sides and traveling in a horizontal plane, means for feeding books in a substantially upright position to said conveyer adjacent to one of the parallel sides thereof, a source of supply of covers located adjacent the same side of the conveyer, adhesive applying means and cover breaking means located adjacent to the path of the conveyer and intermediate the book feeding means and the source of supply of covers, and cover feeding means for feeding covers singly from the source of supply underneath the cover breaking means and upwardly to the path of the conveyer between the adhesive applying means and the cover breaking means.

Signed at New York city in the county of New York and State of New York this 17th day of April A. D. 1916.

CHARLES A. JUENGST.